3,376,290
PROCESS FOR PREPARING BENZODIAZEPINES
Rodney Ian Fryer, North Caldwell, and Leo Henryk Sternbach, Upper Montclair, N.J., assignors to Hoffmann-La Roche Inc., Nutley, N.J., a corporation of New Jersey
No Drawing. Filed Dec. 9, 1965, Ser. No. 512,773
9 Claims. (Cl. 260—239.3)

ABSTRACT OF THE DISCLOSURE

Reacting 2-amino benzophenone imines with haloacetyl halides to prepare 1,4-benzodiazepin-2-ones.

---

The present invention relates to novel chemical processes. More particularly, the present invention relates to novel chemical processes useful for preparing medicinally valuable 1,4-benzodiazepin-2-ones.

Such medicinally valuable 1,4-benzodiazepin-2-ones are of the formula

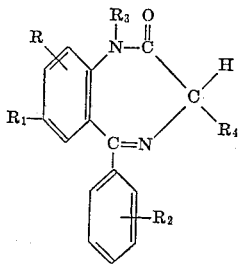

I wherein R and $R_1$ are selected from the group consisting of hydrogen, halogen, nitro, trifluoromethyl and lower alkyl; $R_2$ is selected from the group consisting of hydrogen and halogen; $R_3$ is selected from the group consisting of lower alkyl, $C_3$–$C_6$ cycloalkyl and $C_3$–$C_6$ cycloalkyl-lower alkyl; and $R_4$ is selected from the group consisting of hydrogen and lower alkyl.

The novel process aspect of the present invention involves reacting a 2-aminobenzophenonimine of the formula

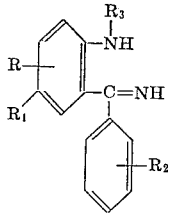

II wherein R, $R_1$, $R_2$ and $R_3$ are as above with a compound of the formula

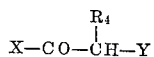

III wherein X and Y are halogen atoms, preferably selected from the group consisting of chlorine, bromine and iodine and $R_4$ is as above.

In the Formula III above, X and Y may connote the same or different halogen atoms. Thus, contemplated within the genus encompassed by Formula III above are such compounds are such compounds as bromoacetyl bromide, chloroacetyl bromide, chloroacetyl iodide and the like.

The term "halogen" as employed throughout the instant specification is intended to connote all four forms thereof, i.e. fluorine, bromine, iodine and chlorine, unless otherwise specified. The term "lower alkyl" as utilized herein represents a straight or branched chain hydrocarbon group such as methyl, ethyl, isopropyl, butyl and the like. The expression "$C_3$–$C_6$ cycloalkyl" designates a group such as cyclopentyl, cyclohexyl, preferentially, cyclopropyl and the like. In a preferred embodiment, $R_1$ in Formulae I and II above is either halogen, advantageously, chlorine or nitro. In a more preferred embodiment, $R_1$ in Formulae I and II above is halogen, advantageously, chlorine, $R_3$ is preferably, methyl, and R is hydrogen. In the most preferred embodiment, $R_1$ in Formula I above is halogen, most advantageously, chlorine, R, $R_2$ and $R_4$ are all hydrogen and $R_3$ is methyl. When $R_2$ is other than hydrogen, it is preferably joined to the 5-phenyl ring at the 2-position thereof.

The starting material of Formula II above can be prepared from a 2-aminobenzophenone of the formula

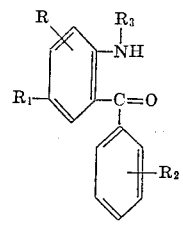

IV wherein R, $R_1$, $R_2$ and $R_3$ are as above by treating the last-mentioned compound of the Formula IV above with ammonia preferably under pressure. Advantageously, the last-mentioned reaction is effected employing a catalyst such as an aprotic Lewis acid, for example, zinc chloride and at elevated temperatures.

The reaction of a compound of the Formula II above with a compound of Formula III above whereby to prepare a compound of the Formula I above is accomplished in the presence of a base. Among the many bases suitable for the purposes of the present invention, there may be included alkali metal hydroxides such as sodium hydroxide, alkaline earth metal hydroxides and the like. In a particularly advantageous process aspect of the present invention, aqueous solutions of alkali metal hydroxides are employed.

Temperature and pressure are not critical in the preparation of compounds of Formula I above from the corresponding compounds of Formula II above. Thus, the conversion of compounds of Formula II above to the compounds of Formula I above will go at room temperature and at atmospheric pressure or at above or below room temperature and/or under pressure. Preferably, the reaction is effected below room temperature. In one particularly preferred process aspect of the present invention, the last-mentioned reaction is run at a temperature of from about 0° C. to about 20° C., most suitable at a temperature in the range of about 5° C. to about 15° C. In the conversion of compounds of Formula II above to the corresponding compound of Formula I above, there is preferentially utilized an inert organic solvent as the reaction medium. Representative of inert organic solvents included within the purview of the present invention are aromatic hydrocarbons such as benzene, toluene, xylene and the like, chlorinated aromatic hydrocarbons such as chlorobenzene and the like or any other suitable solvent.

The foregoing is a description of new and novel processes for the preparation of medicinally valuable 1,4-benzodiazepin-2-ones. It will be readily apparent to one skilled in the art that variations in these procedures are possible.

The following examples are illustrated but not limitative of the procedure for preparing the aforesaid 1,4-benzodiazepin-2-ones. All temperatures are stated in degrees centigrade.

Example 1

A mixture of 97 g. of 5-chloro-2-methylaminobenzophenone, 200 ml. of ammonia, 2 g. of zinc chloride and 200 ml. of methanol was placed in an autoclave which was then charged with an overpressure of 15 atmospheres of nitrogen and heated for 24 hours at 145°. The resulting solution was then evaporated. The residue was taken up in 300 ml. of dichloromethane and the resultant medium was washed, dried and evaporated. Recrystallization of the residue from methanol gave 2-methylamino-5-chlorobenzophenone imine as yellow prisms, melting at 95–97°.

Example 2

A solution of 5 g. (20.7 mmole) of 5-chloro-2-methylaminobenzophenone imine in 50 ml. of benzene was cooled in an ice bath and treated first with 50 ml. of 0.5 N sodium hydroxide and then with a solution of 4.6 g. (22.7 mmole) of bromoacetyl bromide in 10 ml. of benzene. After stirring the mixture vigorously for 15 minutes, 23 ml. of 1 N sodium hydroxide was added thereto. Stirring was continued for an additional 2 hours. The layers which formed were separated and the organic layer was washed, dried, concentrated and then chromatographed over 100 g. of silica. Using benzene, 2-amino-5-chlorobenzophenone was recovered and discarded. When no further ketone was isolated still utilizing benzene as the eluent, the eluent was changed to ether and gave, on evaporation 7-chloro-2,3-dihydro-1-methyl-5-phenyl-2H-1,4-benzodiazepin-2-one as white prisms. Recrystallization from ether gave the product melting at 128–130°.

In the same manner, 2,3-dihydro-1-methyl-7-nitro-5-phenyl-2H-1,4-benzodiazepin-2-one can be prepared from 2-methylamino-5-nitrobenzophenone imine.

We claim:
1. A process for the preparation of a compound of the formula

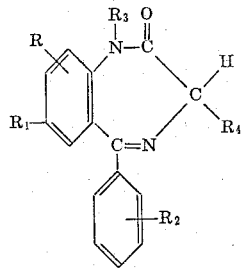

(I)

wherein R and $R_1$ are each selected from the group consisting of hydrogen, halogen, trifluoromethyl, nitro and lower alkyl; $R_2$ is selected from the group consisting of hydrogen and halogen; $R_3$ is selected from the group consisting of lower alkyl, $C_3$–$C_6$ cycloalkyl and $C_3$–$C_6$ cycloalkyl-lower alkyl; and $R_4$ is selected from the group consisting of hydrogen and lower alkyl which comprises reacting a compound of the formula

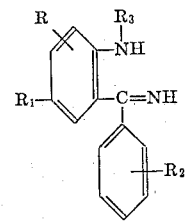

(II)

wherein R, $R_1$, $R_2$ and $R_3$ are as above with a compound of the formula

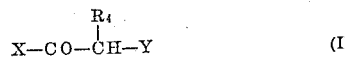

(III)

wherein X and Y are each selected from the group consisting of bromine, chlorine and iodine and $R_4$ is as above in the presence of a base.

2. A process as defined in claim 1 wherein the base utilized is an alkali metal hydroxide.

3. A process as defined in claim 2 wherein the alkali metal hydroxide utilized is sodium hydroxide.

4. A process as defined in claim 3 where, in the formulae illustrated, $R_1$ is halogen, and R, $R_2$ and $R_4$ are all hydrogen.

5. A process as defined in claim 4 wherein $R_1$ is chlorine, R, $R_2$ and $R_4$ are all hydrogen and $R_3$ is methyl.

6. A process as defined in claim 1 wherein $R_1$ is halogen, $R_3$ is lower alkyl and R, $R_2$ and $R_4$ are all hydrogen.

7. A process as defined in claim 6 wherein the base utilized is an alkali metal hydroxide.

8. A process as defined in claim 6 wherein $R_1$ is chlorine, $R_3$ is methyl and R, $R_2$ and $R_4$ are all hydrogen.

9. A process as defined in claim 1 wherein $R_1$ is nitro and R, $R_2$, and $R_4$ are all hydrogen and $R_3$ is lower alkyl.

References Cited

UNITED STATES PATENTS 3,100,770   8/1963   Fryer et al. _____ 260—239.3
3,270,053   8/1966   Reeder et al. _____ 260—239.3

FOREIGN PATENTS 103,527   6/1964   Norway.

JOHN D. RANDOLPH, *Primary Examiner.*
WALTER A. MODANCE, *Examiner.*
R. T. BOND, *Assistant Examiner.*